United States Patent [19]

Hanson

[11] 4,267,209

[45] May 12, 1981

[54] METHOD OF DECORATING A SURFACE OF A CERAMIC ARTICLE

[75] Inventor: Martin B. Hanson, Huntington Beach, Calif.

[73] Assignee: Interpace Corporation, Parsippany, N.J.

[21] Appl. No.: 45,751

[22] Filed: Jun. 5, 1979

Related U.S. Application Data

[63] Continuation of Ser. No. 794,849, May 9, 1977, abandoned.

[51] Int. Cl.³ .................. B05D 5/02; B05D 1/12; B05D 1/36
[52] U.S. Cl. .................. 427/199; 427/376.2; 428/207; 428/208
[58] Field of Search ........... 427/197, 198, 199, 266, 427/376 A, 376.2, 376.3; 428/208, 206, 207; 118/308, 312; 106/48, 49

[56] References Cited

U.S. PATENT DOCUMENTS

| Re. 16,048 | 4/1925 | Scott et al. | 427/269 |
|---|---|---|---|
| 505,303 | 9/1893 | Withers | 427/268 |
| 1,531,613 | 3/1925 | Hommel | 427/193 |
| 2,109,205 | 2/1938 | Woodward | 118/312 |
| 2,466,682 | 4/1949 | Bryant | 428/208 |
| 2,689,801 | 9/1954 | D'Alelio | 427/197 |
| 3,089,782 | 5/1963 | Bush et al. | 427/269 |
| 3,144,344 | 8/1964 | Umhoefer | 106/48 X |
| 3,350,483 | 10/1967 | Erb et al. | 264/74 |

FOREIGN PATENT DOCUMENTS

| 158121 | 12/1951 | Australia | 427/198 |
|---|---|---|---|
| 623973 | 5/1949 | United Kingdom | 427/197 |
| 1342108 | 12/1973 | United Kingdom | 427/266 |

*Primary Examiner*—Evan K. Lawrence
*Attorney, Agent, or Firm*—Poms, Smith, Lande & Rose

[57] ABSTRACT

A method for decorating a surface of a ceramic article wherein a selected design is delineated on said surface by applying to said surface an adhesive flowable sticky medium comprising ceramic and organic material including an organic gum, Bentonite, and a frit material. Particulate material in the form of discrete flowable granules of ceramic and organic material are applied to the adhesive medium where the granules at ambient temperatures stick to the adhesive medium coating on the article. Excess granules are removed from the sticky adhesive medium and adjacent surfaces. The article is then fired; the ceramic body and the ceramic material and organic material of the adhesive medium and of the granules interacting during firing and fusing together without exhibiting crawling and maintaining design area integrity.

9 Claims, 9 Drawing Figures

U.S. Patent   May 12, 1981   Sheet 1 of 2   4,267,209
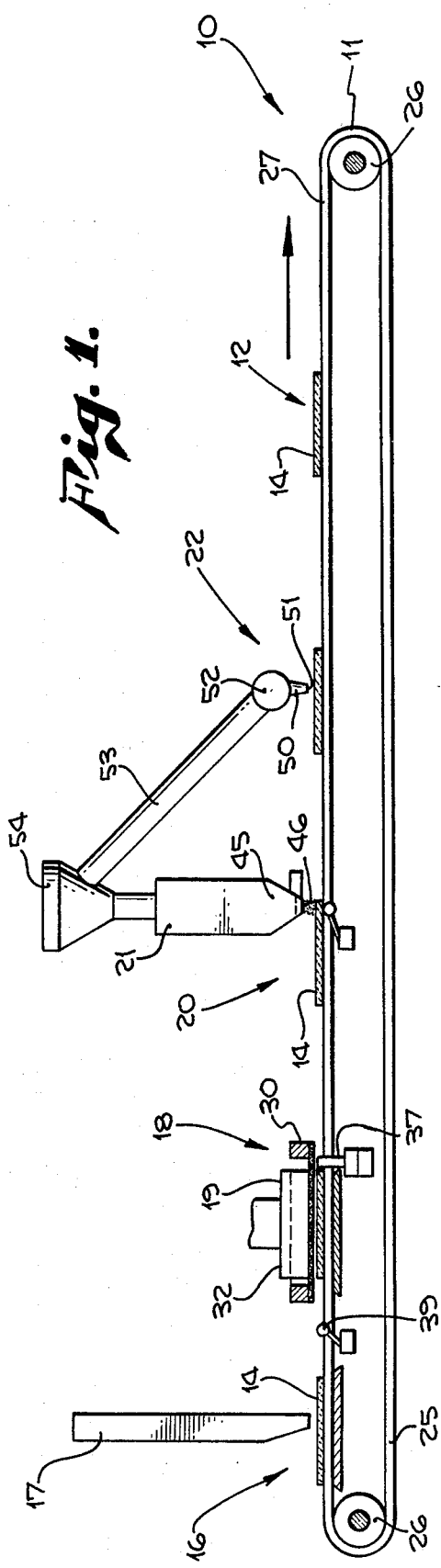
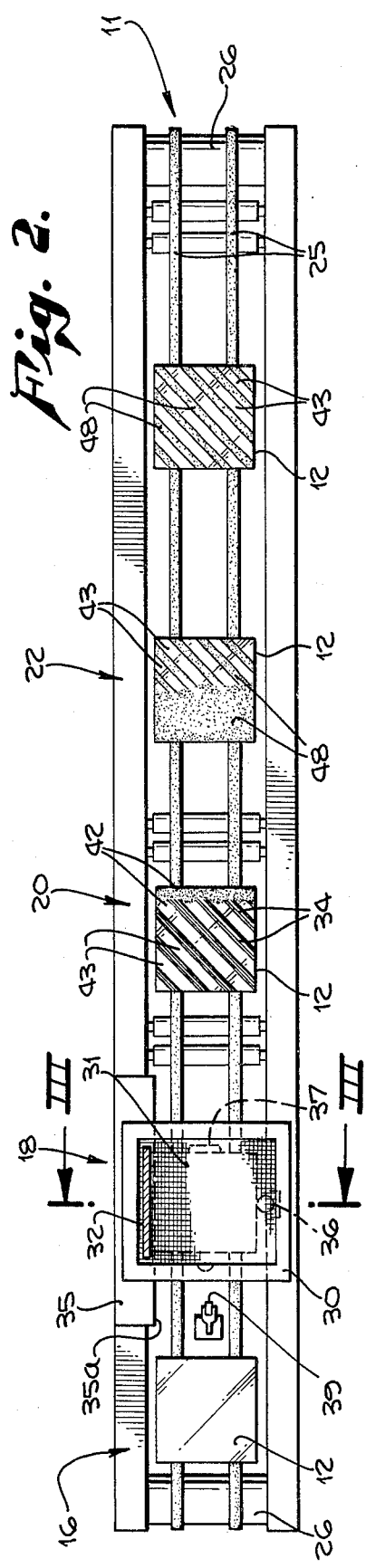
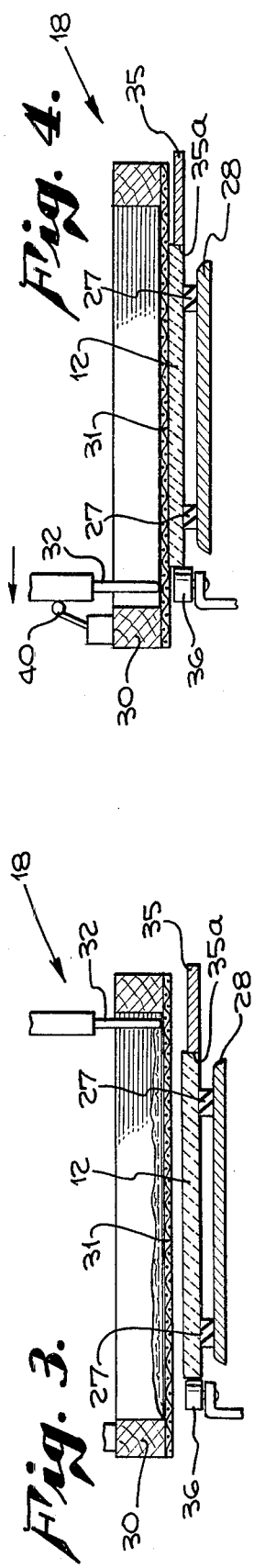

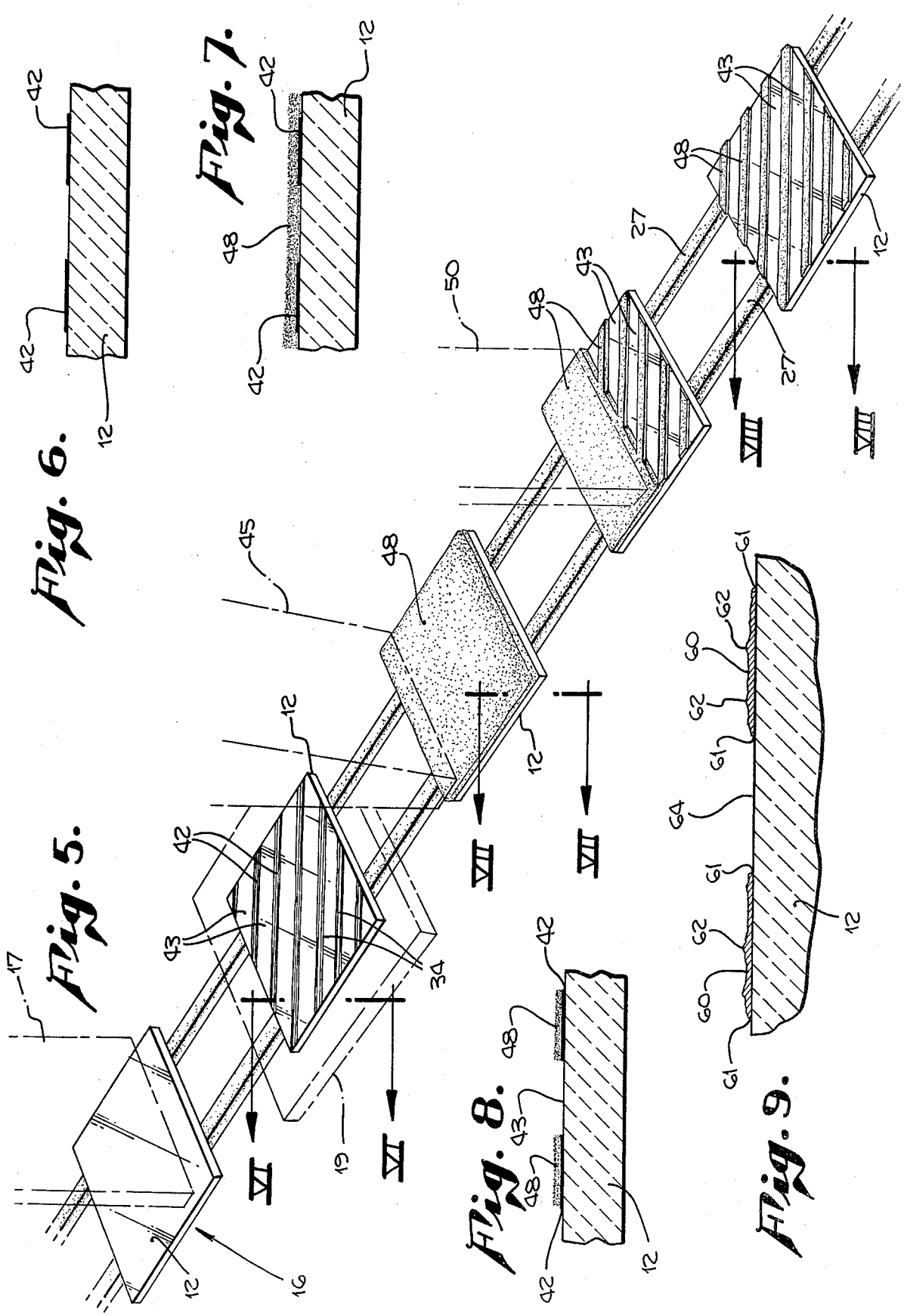

METHOD OF DECORATING A SURFACE OF A CERAMIC ARTICLE

This is a continuation, of application Ser. No. 794,849 filed May 9, 1977, abandoned.

BACKGROUND OF THE INVENTION

Ceramic bodies are utilized for many purposes because of their resistance to wear, ease of handling, and the limitless number of design patterns which may be applied to the ceramic surfaces for enhancing the esthetic and beauty of the location in which they are installed. Ceramic bodies made in the form of wall tile, counter tile, and floor tile may be of any polygonal shape and may be glazed and fired so that the designs thereon are permanent.

Various apparatus and methods have been employed to decorate the surface of such ceramic bodies. The decorative surfaces may be made of different colors, different artistic patterns, of smooth planar surfaces, and of irregular surfaces, depending upon the location and the use of the ceramic tile. Various problems were encountered in the decoration of such ceramic tile surfaces in maintaining a selected design pattern without overlapping or crawling of one design area into an adjacent or contiguous design area to thereby change the esthetic effect of the selected design. Designs have been applied by hand painting, stencilling, stamping, silk-screening, bulbing, and numerous other methods. Some of the prior proposed methods which are relevant to the present invention include the marking of a design with an organic material such as a vegetable oil of low viscosity and absorbent, then sprinkling colored glass particulates some of which are coarse and some of which are fine on the vegetable oil and then firing the article to fuse the glass particulates with the body of the article. During the firing which accomplishes the fusing of the glass to the body, the organic vegetable oil was burnt off. See U.S. Pat. No. 1,531,613. In U.S. Pat. No. 3,089,782, multicolored decoration of a ceramic surface is provided by silk-screening on the surface a ceramic flux, inorganic ceramic pigments and a thermo-fluid vehicle consisting of a quick hardening wax and thermo-plastic resin when exposed to temperatures less than 100° F., the vehicle being fluid between 100° F. and 500° F. and completely volatized at above 800° F. Solidification below 100° F. permitted the application by silk-screening of up to eight different colors before firing.

In U.S. Pat. No. 2,689,801 a thermo-plastic surface is covered with solid granular or particulate material by means of conveying heated particulate material by gas to the thermoplastic surface.

The application of granular or particulate material to provide a design on a surface to be decorated is also used in the manufacture of floor coverings employing a substrate or base of felt or other like material. See U.S. Pat. No. 334,483.

Prior proposed methods and products made thereby, with respect to a specific example of this invention, were not concerned with a granular composition and construction readily applied to a design on the surface to be decorated, the granules retaining their discreteness until fired, and then interacting with adhesive material to provide a design or pattern which maintains its integrity during firing.

SUMMARY OF THE INVENTION

The present invention relates to a method for decorating the surface of a ceramic body such as ceramic tile. The invention particularly relates to a method of decorating the surface of such a tile wherein novel color combinations can be achieved and unusual esthetic effects produced by the use of particulates or granules of ceramic composition material in which the granules are compounded in novel manner. The invention contemplates a novel method of applying such granules to a particular design on the surface of a ceramic tile and also contemplates a novel ceramic product having a decorative surface with unique characteristics. Generally speaking, a method embodying this invention includes moving a ceramic article along a path, applying a selected design or pattern to the article by means of a ceramic and inorganic adhesive material deposited on the article by silk-screening or other suitable process, flowing discrete granules of ceramic composition material on the article whereby granules adhere to the adhesive material, removing excess granules from the article, that is, those granules not sticking to the design defined by the adhesive material, and firing the article to cause reaction of and fusing of the granules, adhesive material and article. The granules are composed to provide desired color, to retain discreteness, to avoid abrading, and to provide a selected particulate size range which will cover the design areas in a generally uniform manner. The adhesive material is sufficiently flowable or semi-viscous to be applied through a silk-screen. The article resulting from the practice of this invention has a decorated surface of irregular three-dimensional characteristics providing a non-slip surface when used as a floor covering. The non-slip surface characteristic may be enhanced by including in the granules hard particles of suitable material which are partially exposed at the decorated surface after firing.

The primary object of the present invention is to provide a method for decorating a ceramic surface by applying granules of ceramic composition material to the surface in a novel manner.

Another object of the present invention is to provide a method for decorating a ceramic surface with a preselected design wherein the design is indicated on said surface by application of a ceramic and organic adhesive material which provides a sticky coating at ambient temperatures.

Another object of the present invention is to provide a method for decorating the surface of a ceramic tile in which ceramic glaze composition material is formed into granules which may be applied to the sticky adhesive coating and which will react therewith during firing to form the desired pattern.

A still further object of the present invention is to disclose a method of forming granular particles for use in application to a ceramic surface to be decorated.

A still further object of the present invention is to provide a novel ceramic and organic adhesive material for coaction with the surface of a ceramic body and with granular particulates deposited and adhered thereto to designate a selected design pattern.

Other objects and advantages will be readily apparent from the following description and drawings in which an exemplary embodiment of the invention is shown.

BRIEF DESCRIPTION OF THE DRAWINGS

FIG. 1 is a schematic side view of an apparatus embodying this invention.

FIG. 2 is a top plan view of the conveyor shown in FIG. 1 illustrating several steps of the method of this invention correlated to the schematic apparatus of FIG. 1.

FIG. 3 is a transverse selectional view taken in a vertical plane indicated by line III—III of FIG. 2.

FIG. 4 is a fragmentary view taken at the same plane as FIG. 3 and showing the doctor blade at end of its stroke.

FIG. 5 is an enlarged perspective view of the conveyor shown in FIG. 2 and further illustrating the steps of the invention, apparatus as shown in FIG. 1 being illustrated in phantom lines.

FIG. 6 is a sectional view taken in the vertical plane indicated by line VI—VI of FIG. 5 of an article being decorated at a first station of the apparatus.

FIG. 7 is a fragmentary sectional view taken in the plane indicated by line VII—VII illustrating a second step of the invention taken at a second station.

FIG. 8 is a fragmentary sectional view taken in the plane indicated by line VIII—VIII of FIG. 2 illustrating the cross-section of an article bearing a design and prior to firing.

FIG. 9 is an enlarged fragmentary sectional view of an article after firing illustrating in somewhat exaggerated form the decorative coating on the surface of the article.

DETAILED DESCRIPTION

Apparatus 10, schematically illustrated in FIG. 1, comprises a continuously moving endless conveyor belt means 11 along which are provided several operational stations for decorating an article of manufacture 12 which may be made of ceramic material and which has a surface 14 to be decorated. In this example article 12 is a flat planar ceramic tile body adapted for use as a floor covering, wall covering, and other like suitable uses. Generally, along the path provided by conveyor 11 is a station 16 at which ceramic body 12 is placed on belt 11 and subjected to surface cleaning by a suitable vacuum means 17. Adjacent station 16 is station 18 which includes a silk-screening device 19 as more fully described later. Further down the path defined by conveyor 11 is a station 20 which includes a hopper means 21 for a supply of granules to be deposited upon the upwardly facing surface 14 of body 12. Adjacent station 20 is a succeeding station 22 provided with vacuum means for withdrawal of excess granules deposited on surface 14 by hopper 21. Beyond station 22 body 12 may be transferred from conveyor means 11 to suitable other conveyor means for transport to a kiln for firing. The equipment at the several stations 16, 18, 20 and 22 is generally well-known.

Article 12 may comprise a suitable ceramic composition and may be of square or polygonal shape as sown or of any other suitable configuration. Body 12 may be in green, bisque, or fired state. A plurality of ceramic bodies 12 may be supplied to station 16 in any convenient manner so that they may be rapidly fed to the conveyor 11 at selected spaced intervals.

In this example, conveyor 11 may be supported from a floor by a suitable frame (not shown) to provide a convenient working height for the placement and handling of ceramic bodies 12 thereon. Conveyor means 11 includes in this example a pair of endless conveyor members 25 which extend between end cylindrical rolls 26, one of which may be driven at a selected speed by a drive and motor means not shown. The upper lays 27 of conveyor members 25 may be suitably supported along their length as for example by flat horizontal plates at station 16 and at station 18 and by a plurality of suitable transverse idle rollers at stations 20 and 22 and to the end of conveyor 11. Such transverse rollers are shown and a horizontal plate 28 shown in FIGS. 3 and 4 at station 18. It will be understood that conveyor means 11 may include one or more conveyor sections aligned to advance ceramic body 12 along a preselected path.

At station 16 a ceramic body 12 may be manually placed on the upper lays 27 of the conveyor members 25 or may be fed thereto by a suitable infeed conveyor not shown. At station 16 a vertial duct 17 is shown, said duct having a tapered lower portion to provide a relatively narrow transverse opening to the duct closely adjacent to the upper surface of body 12 when it is supported on the top lays 27. A suitable vacuum pump may be attached to the duct 17 so that a vacuum or sucking action is provided for the removal of any loose dust or foreign particles from the surface 14 to be decorated. It will be understood that other apparatus may be used for assuring that the surface to be decorated is clean and in condition for receiving an adhesive medium of this invention.

At station 18, there is schematically illustrated a silk-screening apparatus 19 which is well known in the art. Such a silk-screening machine may be a Gabrielli machine which may include an open rectangular frame 30 having its bottom opening covered by a silk-screen 31 which includes a selected design to be imparted to the surface 14. Within the frame 30 is a squeegee or doctor blade 32 movable by well-known means from one side of the frame 30 to the opposite side thereof. Beneath the frame 30 a body 12 is supported by the top lays 27 which slide along the top surface of a plate 28 so that the body 12 may be supported in substantially unyielding manner. Also, within open frame 30 is a selected quantity of adhesive medium 34, later described in detail.

Means are provided for precisely registering the position of body 12 with the design on the silk-screen 31. In this example in FIG. 3, a fixed guide member 35 is provided on one side of conveyor 11 and an adjustable biased guide 36 is provided on the opposite side thereof. Thus, when the body 12 advances into station 18 an edge of body 12 is urged into engagement with the guide edge 35a of guide member 35 by the adjustable guide roller 36 to precisely position the tile laterally of the conveyor. As shown in FIG. 1, a body 12 is stopped from advancement along the conveyor 11 by a vertically movable stop member 37 which moves into the path of body 12 and contacts the leading edge of body 12 to hold it in registered position beneath the silk-screen 31 while the conveyor members 25 continue to advance.

The application of the adhesive medium 34 to the surface 14 to be decorated through the silk-screen 31 is well-known. As the body 12 advances along the conveyor, a limit switch 39 is contacted by the leading edge of tile 12 for actuating the stop 37 so that the body 12 will be stopped beneath the silk-screen apparatus 19. When the body 12 is stopped and in registered position, doctor blade 32 will traverse the silk-screen and cause the adhesive medium 34 to be pressed downwardly through the openings in the silk-screen to deposit on the surface 14 the pattern of the silk-screen. The doctor blade 32 then returns to its initial position at one side of the frame. In such squeegeeing of the adhesive medium 34 through silk-screen, the entire rectangular frame may be moved downwardly so that intimate contact is had between the silk-screen and the surface 14. When the doctor blade 32 returns to its initial position, it may contact a limit switch 40 which will cause the stop 37 to be retracted to permit the body 12 to advance along the conveyor 11.

As the body 12 emerges from station 18, an exemplary pattern comprising spaced diagonal lines is shown on surface 14 in FIG. 2. Each of the diagonal lines 42 comprises a thin coating of adhesive medium. The adhesive medium presents a surface or coating which is sticky and tacky at ambient temperatures and which does not rapidly dry or become non-tacky. The surface 14 of the tile is thus divided into first design areas represented by the adhesive medium strips 42 and second design areas represented by the alternate surface areas 43 lying between the adhesive strips 42. When body 12 is released from station 18, it proceeds toward station 20 along conveyor means 11.

At station 20, a supply hopper 21 is provided and hopper 21 contains a plurality of granular particulate material of a selected composition as later described. Hopper 21 is provided with a bottom portion 45 with steeply inclined walls to permit gravity flow of the granular material through an opening 46 which comprises a transversely disposed slot having a width selected to provide a continuous flow of granular material therethrough. The flow of granular material is sufficient to deposit on the surface of body 12 a uniform continuous layer of granular material without gaps or openings in the deposited layer.

The length of slot opening 46 is sufficient to transversely cover the surface 14 of body 12 as body 12 passes beneath the supply hopper 21. The gravity flow of the granules and the speed of the continuously moving conveyor members 25 is such that the granules are spread evenly over surface 14 for the entire width and length of surface 14. Granules which fall from supply hopper 12 while a body 12 is not beneath the slot opening 46, fall between idle rollers at that conveyor portion and may be collected beneath the supply hopper and conveyor means 11 in a suitable receptacle for recycling or other disposition. A limit switch 47 is positioned on the conveyor means 11 so that when the leading edge of a body 12 contacts switch 47, the gate on the supply hopper will have sufficient time to open and a transversely extending curtain of granules will be deposited on surface 14 at the leading edge of body 12. Similarly when the trailing edge of body 12 releases the switch 47 and causes the gate to close opening 46 to shut off flow of granules.

Thus, as body 12 leaves station 20, the surface 14 which included design areas covered by adhesive material and second design areas not covered by adhesive material is now completely covered with a layer of granules. The granules stick or adhere to the first design areas covered by the strips of adhesive material and also cover the second design areas which do not include adhesive material. Preferably, the layer of granules placed upon the surface 14 is laid at a density so that no excess granules will be placed upon the first adhesive design areas.

As the body 12 moves along conveyor 11, it passes into station 22 at which a transversely disposed suction member or nozzle 50 is provided. Suction member 50 has a transversely disposed opening 51 located in relatively close spaced relation to the surface 14. Vacuum member 50 communicates with a suitable vacuum pump 52 which sucks and draws excess granules from surface 14 and passes the excess granules into an inclined duct 53 to be discharged into a cone 54 which may include a cyclone type separator. The separator removes the fines from the granules picked up by the suction member 15 and disposes of the fines in suitable manner. Granules which are of a size not passed as fines are returned to the supply hopper 21 for spreading upon succeeding bodies 12.

After leaving station 22, it will be apparent from FIG. 2 and also FIG. 5 that surface 14 of body 12 is provided with a design comprising selected design areas including an adhesive medium of selected configuration and a plurality of granules 48 adhered to the adhesive medium 34 in the contours or configuration of the adhesive medium 34. Between such composite design portions, an uncovered design surface area 43 is provided. Body 12 is now ready for firing and may be transported by suitable means to a kiln for firing at selected temperatures.

Before reaching the kiln, it will be noted that the body 12 with the adhesive medium and granules stuck thereto are maintained in such condition at ambient room temperature or temperatures below 100° F.

During firing of the ceramic body, organic components of the adhesive medium are burned away. Such burning away will occur at temperatures up to 800° F. Firing temperatures above 800° F. cause an interaction between the ceramic compositions of the adhesive material and the ceramic compositions of the granules to provide a fusing of the pattern at the design areas occupied by the adhesive medium and to also fuse the design portion to the body 12. The composition of the adhesive medium is such that during such firing crawling or spreading of the adhesive medium or the granule material is inhibited so that the precise design configuration is fused and becomes permanent.

It will be understood, of course, that after leaving station 22 the body 12 may be subjected to an overglaze prior to firing in a kiln.

The granule composition material is prepared in a novel manner and includes in its composition material ingredients which when fired provide a desired color on the surface being decorated. The preparation of the granules includes preparing a batch of raw materials which may comprise available frits, silica, gums and aluminum oxide where a non-slip surface is desired. An exemplary composition for a granule comprises Pemco Frit P-3E-12—7.00
Pemco Frit P-786—16.00
Ferro Frit 221-201—24.00
Superpax—22.00
Supersil Silica—11.00

Superpax is a zirconium silicate composed of approximately 62.2% $ZiO_2$, 36.6% $SiO_2$. Pemco Frit P-3E-12 is a glaze frit having the following composition:

|  | Percent | Mol. Wt. |
|---|---|---|
| $K_2O$ | 6.7 | .18 |
| $Na_2O$ | 3.0 | .12 |
| $CaO$ | 6.2 | .29 |

-continued

|       | Percent | Mol. Wt. |
|-------|---------|----------|
| MgO   | 1.4     | .09      |
| ZnO   | 10.1    | .32      |
| $Al_2O_3$ | 13.2 | .33      |
| $B_2O_3$  | 4.9  | .18      |
| $SiO_2$   | 51.4 | 2.21     |
| $ZrO_2$   | 3.1  | .06      |

Pemco Glaze Frit P-786 is composed of:

|       | Percent | Mol. Wt. |
|-------|---------|----------|
| $K_2O$    | 3.0  | .09      |
| $Na_2O$   | 2.0  | .09      |
| CaO   | 11.5    | .58      |
| SrO   | 8.7     | .24      |
| $Al_2O_3$ | 6.8  | .19      |
| $B_2O_3$  | 8.8  | .36      |
| $SiO_2$   | 59.2 | 2.80     |

These raw materials in relatively dry powdered form are dry mixed together in a suitable mixer such as an Eirich machine. After dry mixing for a selected period of time to assure complete intermixing of the ingredients, a granulating medium is added to the mixture. Such granulating medium may include suitable organic gum solutions to not only granule the dry intermixture, but to also provide a relatively hard surface on the granules which will resist abrasion. The mixture, together with the granulating medium, is further intermixed in the Eirich machine for a suitable length of time. Such a granulating medium may include Klucel 16% solution and CMC 7L 17% solution. CMC 7L is a sodium carboxymethyl cellulose gum having an approximate weight average molecular weight of 80,000, made by Hercules, Inc. Klucel is the trademark for a hydroxypropylcellulose made by Hercules, Inc. mixing period, the gum has changed the dry intermixture into granulated form having fines, granules ranging from −30 to +60 mesh (United States Bureau of Standards) and larger granules. The fines and the larger granules are separated from the granular mix and the granules of the selected size range are then placed in an oven for drying at about 150° F. It is desired that the granules be almost absolutely dry; that is, less than one-half percent by weight of moisture. When the granules are dry, they form very hard, discrete pellets of the selected mesh size. The mesh range for dry granules for use in the supply hopper 21 may include a range from −20 to +54 mesh. After the granules have been screened to desired mesh size a suitable grit may be added to the granules to give the decorated surface a non-skid surface, if desired. An example of such grits are aluminum oxide and blastite.

The adhesive composition is somewhat similar to the granule composition, contains selected ceramic clays and fluxes, and is in the form of a semi-viscous, sticky mass capable of being applied through a silk-screen mesh and remaining sticky at ambient temperatures. In the preparation of the adhesive medium, the raw materials may be placed in a mixer machine, such materials including Ferro frit, Bentonite, and an organic gum. An example of portions is given below Ferro Frit 221-201—11.00
Bentonite—0.10
CMC, 7L 17% Solution—66.00
Rhoplex 70/30 Solution—14.000 mL Rhoplex is an aqueous emulsion of an acrylic polymer made by Rohm and Haas Co.

The Ferro Frit 221-201 in this example may include the following composition:

BaO—2.7%
CaO—2.47%
MgO—12.19%
$Al_2O_3$—17.62%
$B_2O_3$—28.53%
$SiO_2$—36.49%

The raw materials, Ferro Frit and Bentonite, are dry mixed in the machine for a selected period of time and then the gum and a wetting agent Rhoplex is added to the dry mix for further blending in the mixing machine. After blending for a selected period of time, the material is semi-viscuous, pasty and flowable to a limited extent. It will be noted that the adhesive composition material includes ceramic and organic materials which during firing provides a means for holding the granules stuck thereto in desired position to accomplish the creation of the design.

The organic material in the adhesive composition serves to hold the granules in place during heating up to about 500° F. where the organic ingredient is burned out. The Bentonite in the mixture serves to hold the granules in place in the temperature range of about 500° to 1300° F. and prevents crawling of the granules which by that time are melting and fusing. The use of the Ferro frit holds the granules from crawling at temperatures above 1500° F. Thus, the use of an adhesive composition containing ceramic and organic ingredients holds the granules in place during firing and fusing of the granular composition material with the adhesive composition material and with the ceramic body.

An enlarged partial cross-section of body 12 showing the configuration of the surface of the body after firing is shown in FIG. 9. Designated design areas previously identified by the adhesive strips 42 are now composed of fused granules and the ceramic components of the adhesive material to form an irregular surface 60 having edges 61 which closely conform to the edges of the adhesive strips 42 as applied to the surface 14 of body 12. The irregular surface 16 may have sharply designated points 62 thereon which illustrate the hard particles of aluminum oxide or blastite which were added to the mix of granules to enhance the non-slip characteristics of the surface. In appearance the irregular surface 60 resembles a stippled surface which results from the use of the granules which retain some granular identity after firing. Such granular identity is due to the size difference of the granules and the color in each granule. Color variations between granules of the same mix may be very little to create a non-contrasting, soft, stippled effect.

The granules may be composed to provide one color. Granules of different colors may be made and intermixed to provide a desired esthetic effect.

Referring again to FIG. 9, it should be noted that between the strips or bands of irregular surfaces 62 there is a relatively flat recessed surface 64. Recessed surfaces 64 represent the areas of surface 14 to which adhesive material was not applied. The surfaces 64 may include a glaze covering which may be of any suitable color and which provides a background color and appearance for the design formed by the granules. Such background color, together with the colors of the granules, provides design variations for creating many different esthetic effects. It will be understood that a glaze may be applied over the granules before firing.

It will be understood that other ceramic clays, fluxes, stains, ceramic colors may be used in the composition of the adhesive material and granule material to provide a desired pattern or design. The use of an organic gum in the ceramic composition materials described above serves to maintain granular identity and to prevent crawling of the material during firing. The hard surfaced granules permit the supply of granules to readily flow by gravity through the gate opening at the bottom of the supply hopper without bridging or blocking of the opening which might occur if the granules lost their identity and became interlocked or partially stuck together.

It will also be understood that the term "flowing" as used in the description and claims for application of the design pattern on the ceramic surface means a liquid, semi-pasty, pasty, or spreadable composition material capable of being applied and deposited upon a surface.

Various changes and modifications may be made in the invention described above which come within the spitit of this invention and all such changes and modifications coming within the scope of the appended claims are embraced thereby.

I claim:

1. In a method of decorating a ceramic surface on a ceramic body, the step of:
   advancing a ceramic body having a top surface to be decorated along a path;
   supplying a flowable ceramic and organic adhesive material including an organic gum, Bentonite, and a frit material adjacent to said path;
   flowing said adhesive material onto said surface to be decorated to provide a preselected design defined by first surface areas covered by said material and by secod surface areas not covered by said material;
   said first surface areas being sticky at ambient temperatures;
   flowing discrete hard dry granules of a ceramic composition material including an organic gum over said first and second surface areas as said body moves along said path;
   said granules adhering to said adhesive material in said first sticky surface areas and not adhering to said second areas;
   removing said granules from said second surface areas while said body moves along said path;
   and firing said ceramic body, adhesive material thereon, and granules on said adhesive material, wherein said granules, adhesive material and ceramic body interact with each other to provide a coherent design said organic gum in said granules coacting with the organic gum, Bentonite, and frit material in the adhesive material to maintain said coherent design by inhibiting crawling of the granules during firing and fusing the granules to the ceramic body and the adhesive material and to provide some granular identity after firing.

2. In a method of decorating a surface of a ceramic body including the steps of:
   applying to at least a portion of the surface to be decorated an adhesive material containing an organic gum, Bentonite, and a frit,
   depositing on said material discrete hard, dry granules of a ceramic composition material including an organic gum;
   firing said ceramic body, adhesive material thereon, and granules on said adhesive material,
   said granules adhering to and interacting during firing and fusing with said adhesive material to control crawling of said ceramic composition material and to maintain some granular identity after firing to provide an irregular three-dimensional surface.

3. In a method of decorating a ceramic surface on a ceramic body, the steps of:
   supplying a flowable ceramic and organic adhesive material containing an organic gum, Bentonite, and a frit material;
   applying said adhesive material onto to said surface to be decorated in preselected design areas;
   said adhesive material providing a sticky coating at said design areas;
   depositing discrete hard, dry granules of a ceramic composition material including an organic gum on said sticky coating;
   and firing said ceramic body, sticky coating, and said granules wherein interaction of said ceramic body, sticky coating, and granules during firing, fusion thereof, and after firing, inhibits crawling of said granules and maintains and provides a coherent selected design with granular identity to provide an irregular slightly three-dimensional surface.

4. In a method of decorating a surface of a ceramic body to provide an irregular three-dimensional decorated surface, the steps of:
   providing a flowable ceramic and organic adhesive material including an organic gum, Bentonite, and a frit material;
   depositing said adhesive material onto said surface in a selected pattern to provide adhesive coated and nonadhesive coated areas;
   applying preformed hard discrete dry granules of a size of between −20 and 54 mesh and of selected composition material to said surface for adherence to said adhesive-coated areas;
   said selected granular composition material comprising intermixed materials including organic gums for granulation of the intermixed material and to provide said hardness;
   removing granules from said nonadhesive-coated areas;
   firing said ceramic body with said adhesive material and said discrete granule material thereon;
   and inhibiting crawling of said granules during firing by the organic gum, Bentonite, and frit material in said adhesive material and by the organic gum in said granules, said granules being fused with the ceramic body and adhesive material during firing, whereby integrity of the selected pattern is maintained and after firing some granular identity is retained to provide the irregular three-dimensional decorated surface.

5. A method of decorating a surface as claimed in claim 4 wherein the step of inhibiting crawling of said granules includes
   providing an organic gum material in said adhesive composition material for inhibiting crawling of said granules during firing up to about 500° F.

6. In a method as claimed in claim 5 including the step of
   providing Bentonite in said adhesive composition material for inhibiting crawling of said granules during firing from about 500° F. to 1300° F.

7. In a method as claimed in claim 6 including the step of
 providing a frit for inhibiting crawling of the granules during firing at temperatures above 1500° F.

8. In a method as claimed in claim 4 including the step of
 providing discrete granules having hard, abrasive resistant surfaces.

9. In a method of decorating a surface of a ceramic body by using granules to provide an irregular three-dimensional decorated surface having a selected design, the steps of:
 preparing a granule composition including intermixing selected frits and silica to provide a dry, powderlike mixture,
 adding and mixing a granulating medium including an organic gum to form granules of different size from said mixture,
 separating granules of selected size,
 and drying said selected granules to provide hard, dry discrete granules of selected size resistant to abrasion;
 depositing said granules on the selected design formed by an adhesive composition on a ceramic surface, the adhesive composition including an organic gum, Bentonite, and a frit material;
 firing said ceramic body, granules, and adhesive composition thereon,
 and inhibiting crawling of said granules during firing by the organic gum, Bentonite, and frit material in said adhesive material and by the organic gum in said granules, said granules being fused to the body and adhesive material, whereby integrity of the selected pattern is maintained and after firing some granular identity is retained to provide the irregular three-dimensional decorated surface.

* * * * *